Figures 1, 2:
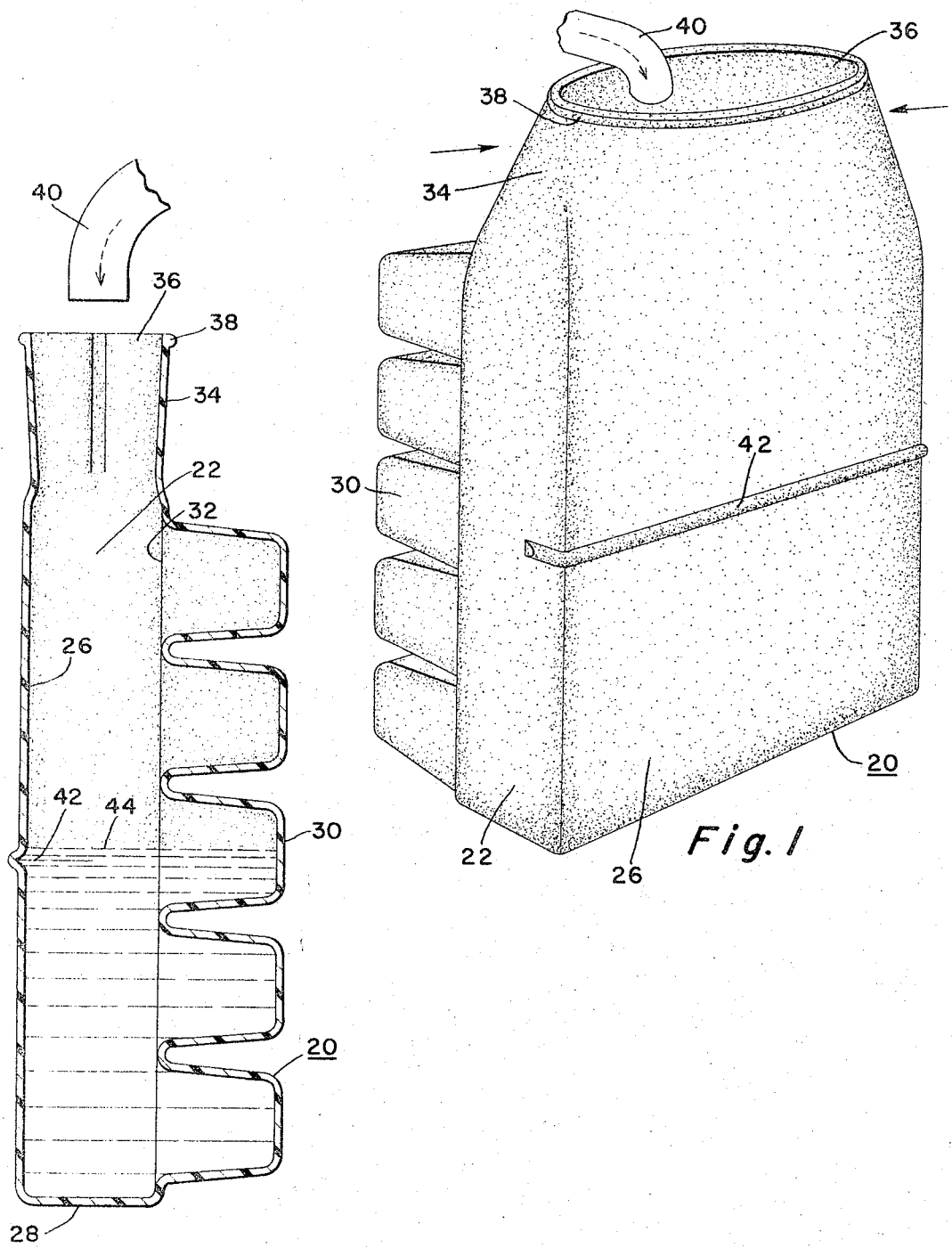

Feb. 28, 1967   A. J. FREI, SR   3,306,567
FLEXIBLE BAG FOR MAKING ICE CUBES
Filed Aug. 20, 1964   2 Sheets-Sheet 1

INVENTOR.
Arthur J. Frei, Sr.
BY
Carl A. Stichel
His Attorney

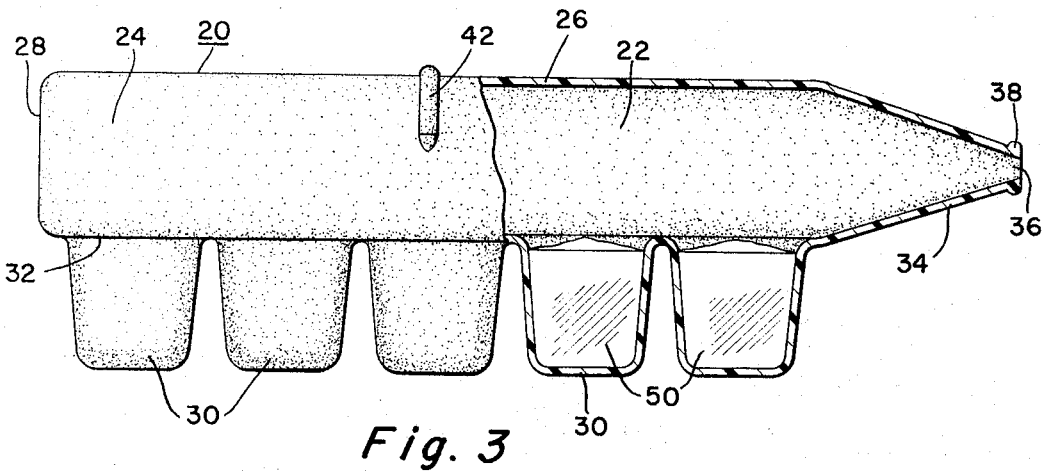
Fig. 3
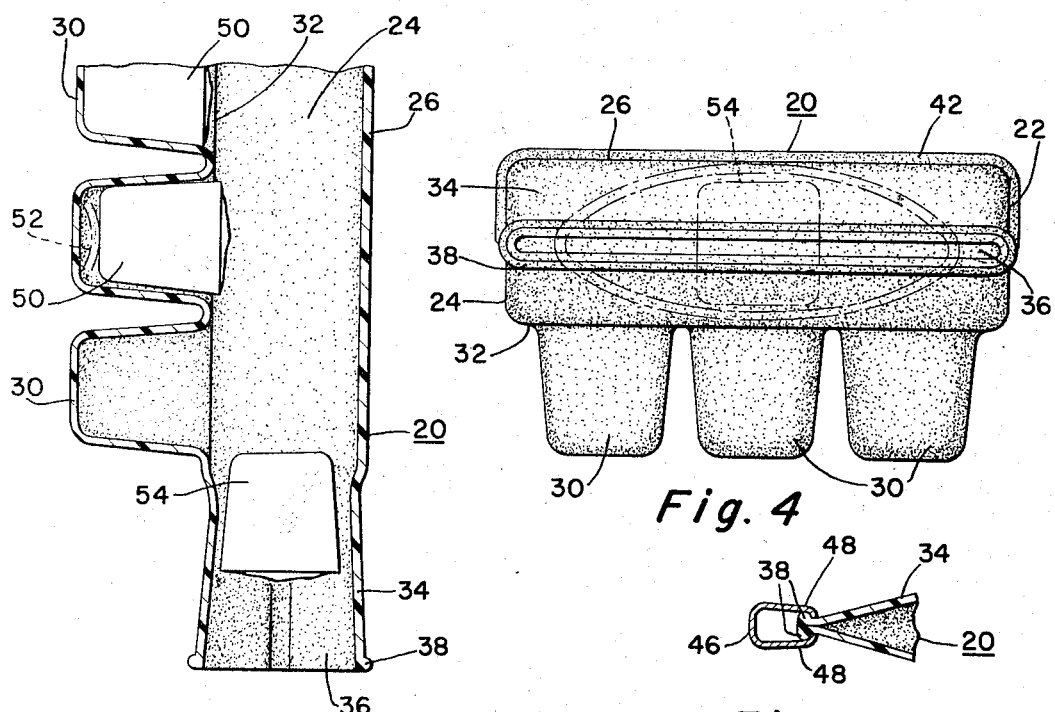
Fig. 4
Fig. 5
Fig. 6
INVENTOR.
Arthur J. Frei, Sr.
BY
His Attorney United States Patent Office 3,306,567
Patented Feb. 28, 1967

3,306,567
FLEXIBLE BAG FOR MAKING ICE CUBES
Arthur J. Frei, Sr., Dayton, Ohio, assignor to General Motors Corporation, Detroit, Mich., a corporation of Delaware
Filed Aug. 20, 1964, Ser. No. 390,842
5 Claims. (Cl. 249—53)

This invention pertains to refrigerating apparatus and more particularly to freezing molds in which pellets or cubes can be removed individually as well as to a freezing bag which can be used for ice bag therapy.

Although the freezing of ice cubes in a domestic refrigerator seems to be a very simple operation, there have been issued thousands of patents relating to from simple to very complex structures for accomplishing this. Even the simplest ice tray after filling has the problem of avoiding spilling of the water in carrying the filled tray from the water faucet to the freezing compartment of the refrigerator. It is also a problem to remove a single pellet or cube from a tray or mold without removing or disturbing the remaining cubes. When an ice pack is used for therapy, it is often necessary to feed the pellets or cubes one by one into a specially designed bag for this use.

It is an object of this invention to provide a portable freezing mold which can be readily filled with an accurately visually determined desired quantity of liquid to be frozen and carried without any substantial possibility of spilling to the freezing compartment of a refrigerator from which after freezing the frozen pellets can be easily removed individually if desired without disturbing the remainder.

It is another object of this invention to provide a portable freezing mold which can be readily filled with an accurately visually determined desired quantity of liquid to be frozen and carried without any substantial danger of spilling to the freezing compartment of a refrigerator which after freezing can be used for ice pack therapy without any spilling or leakage of the contents upon melting.

These and other objects are attained in the form shown in the drawing in which a freezing mold is formed of a translucent or transparent flexible non-metallic material such as a translucent or transparent flexible plastic or rubber into the shape generally of a bag having cube or pellet forming pockets extending outwardly in the one side thereof. The mouth of the bag shaped envelope is shaped so as to close when unstressed. Preferably the flexible material forming the bag shaped envelope is provided with a mark at such a distance above the bottom when the mold is in the upright filling and carrying position to indicate the desirable level of filling which will substantially fill the freezing pockets when the mold is placed horizontally within the freezing compartment. A simple U-shaped straight spring metal clamp may be used to clamp together the mouth of the bag shaped enclosure after the freezing of the liquid therein so that it may be used as an ice bag for ice bag therapy.

The pockets formed in the bag may be made into any desired shape and may, for example, be used for forming various types of frozen confections such as appeal to children. Since the individual pockets are flexible, the pellets or cubes frozen therein may be readily removed by pushing the pocket inwardly and shaking the enclosure while in the inverted position so that the pellet can fall out through the opened mouth of the mold. The mold can be inexpensively made in large quantities by the blow molding process such as is commonly used for the manufacture of plastic bottles.

Further objects and advantages of the present invention will be apparent from the following description, reference being had to the accompanying drawings, wherein a preferred embodiment of the present invention is clearly shown.

In the drawings:
FIGURE 1 is a perspective view of a freezing mold shown in the upright position for filling embodying one form of my invention;
FIGURE 2 is a vertical sectional view through the liquid filled mold in the upright position;
FIGURE 3 is a view partly in elevation and partly in vertical section showing the mold in the horizontal freezing position;
FIGURE 4 is an end view of the mold shown in the horizontal freezing position in FIGURE 3;
FIGURE 5 is a vertical sectional view of the mold in the inverted upright position with the mouth turned downwardly and opened to permit the escape of a frozen cube which has been ejected from one of the pockets; and
FIGURE 6 is a fragmentary sectional view showing a simple method of tightly closing the opening of the mold for carrying the sealed mold in any manner or using it for ice bag therapy without any substantial possibility of leakage.

Referring now to the drawings, there is shown a freezing mold embodying my invention in the form of a one piece bag shaped envelope 20 of a translucent or transparent flexible material having two substantially flat narrow upright side walls 22 and 24, a substantially wide flat upright side wall 26 and a substantially flat horizontal bottom wall 28, when viewed in the position shown in FIGURES 1 and 2. The side opposite the wide flat side 26 is provided with outwardly extending pockets 30 arranged in three upright rows of five pockets each. Although shown generally cube shaped with a substantial taper, other desirable or ornamental shapes may be used. These pockets extend outwardly from the flange 32 which forms the rim of the pockets 30. This rim 32 is spaced away from the opposite wall 26 a distance slightly greater than the depth of each of the pockets 30. Above the pockets 30 the walls extend through a converging section 34 to a wide flat mouth 36 which is surrounded by an annular bead 38. The converging section 34 has a naturally flat shape as indicated in the full lines in FIGURE 4 so that it will normally spring close due to its inherent resiliency.

Preferably the bag shaped enclosure 20 is entirely made of a flexible translucent or transparent formulation of polyethylene by a blow molding process similar to that used in making plastic bottles. However, flexible formulations preferably also translucent or transparent of other non-metallic materials may be used such as vinyl chloride-acetate copolymer, vinyl-vinyledene chloride copolymer, natural or synthetic rubber, or ethyl cellulose.

The pockets 30 may be made in any desired configuration and in any desired number. They, for example, may be made of various shapes suitable for frozen confections. The enclosure has many uses. For example, by pressing the portion 34 on the narrow sides, the wide mouth 36 may be opened from the flat configuration shown in full lines in FIGURE 4 to the oval configuration shown in dot and dash lines in FIGURE 4 and the enclosure filled from an ordinary faucet 40 or other suitable liquid or fluid dispenser as illustrated in FIGURES 1 and 2. The wide side 26 is preferably provided with a bead 42 or other suitable horizontal indicating mark to indicate the desirable filling lever of the liquid to be frozen. When the material of the enclosure 20 is translucent or transparent, the level of the liquid inside the enclosure can be readily compared with the bead 42.

It is very convenient to fill and carry the freezing mold in the upright position of the enclosure 20. The mouth 36 naturally springs shut to the flat shape shown in full lines in FIGURE 4 so that there is substantially no possibility of any of the liquid splashing out of the container while it is being carried. If desired as illustrated in FIGURE 6, a metal spring clip 46 may be drawn laterally over the bead 38 with the sides 48 of the clip springing inwardly to squeeze together tightly the mouth 36. This will positively seal the mouth 36 so that there will be no possibility of any of the liquid being spilled or escaping from the envelope 20 during the carrying of the envelope or the changing of its position from the upright position shown in FIGURE 2 to the horizontal position as shown in FIGURE 3. The liquid 44 to be frozen as indicated in FIGURE 2 extending substantially to the bead 42 will flow in and fill the pockets 30 substantially uniformly when the envelope 20 is placed in the horizontal position with the pockets 30 downwardly. For freezing, the envelope 20 is placed in the freezing compartment of an ordinary domestic refrigerator with the pockets 30 downward and preferably resting on a horizontal freezing surface.

FIGURES 3 and 4 show the horizontal position of the envelope in which the bottoms of the pockets 30 normally rest on a freezing surface for freezing. However, instead of relying on a freezing surface to freeze the liquid contents of the pockets 30, the envelope may be cooled by a cold air blast or air circulation at substantially below water freezing temperatures. However if desired, a combination of these cooling methods may be used. Also if desired, the envelope and its liquid contents could be cooled and frozen in a cold liquid such as a brine.

The exposure of the envelope 20 to below freezing temperatures will freeze the liquid in each of the pockets 30 to form the cubes or frozen pellets 50. The cubes or pellets 50 may be removed individually from the pockets 30 by pushing any one of the pockets 30 inwardly while the enclosure 20 is inverted as illustrated in dotted lines 52 in FIGURE 5 so that the cube or pellet can be pushed into the space between the narrow side walls 22 and 24. The cube such as the cube 54 which has been pushed out of one of the lowermost pockets 30 will then fall downwardly to the converging portion 34. By pushing inwardly the narrow sides of the mouth 36, the narrow mouth is opened to the position shown in FIGURE 3 so that the cubes such as the cube or pellet 54 will readily fall out. It should be observed that this can be accomplished without touching the cube or pellet 54. The cubes or pellets 50 may be removed at any time one by one from the envelope 20 by repeating this process. Without adult aid children can perform all the steps from freezing to removal of a frozen pellet without any substantial possibility of an accident. This makes the enclosure 20 very suitable for children's frozen confections.

The envelope 20 therefore constitutes a freezing mold which can be filled and carried in an upright position without any possibility of spilling and turned in a horizontal position with the pockets downward to fill the pockets to the desired level for freezing.

The enclosure may also be used for ice pack therapy by filling the enclosure to the same depth or to a greater depth of liquid than previously described and sealing the mouth 36 by applying the long metal spring clip 46 to the mouth 36 to squeeze tightly shut the mouth 36 as illustrated in FIGURE 6. The envelope is then placed in the freezing compartment of a domestic refrigerator until its contents are frozen. The bag can then be withdrawn and used for ice pack therapy in the usual manner. The sealing of the mouth 36 will prevent the escape of any of the melting liquid when the enclosure is used for ice pack therapy. In using the envelope for ice pack therapy it is not necessary to completely fill the envelope, but lesser amounts may be applied and only an amount introduced to fill the pockets 30. Liquid may be added to the envelope after freezing so as to provide an enclosure which will conform to various shapes. Thus, the bag enclosure 20 can be used for a variety of purposes without the danger of spilling of the contents and without any necessity for the frozen contents to be touched by anyone's hands. This makes the device especially sanitary and convenient.

While the embodiment of the present invention as herein disclosed constitutes a preferred form, it is to be understood that other forms might be adopted.

What is claimed is as follows:

1. A freezing mold adapted for filling and carrying in an upright position and freezing in a horizontal position including a generally bag shaped one piece envelope of a liquid holding material having a large extensive wall with a substantially unbroken and uninterrupted inner wall surface on one side and having on the opposite side a plurality of outwardly extending flexible freezing pockets extending in substantially the same direction directly away from said one side.

2. A mold according to claim 1 in which the envelope has a flexible resilient mouth formed to a flattened shape to keep the mouth normally closed due to its inherent resiliency when unstressed.

3. A mold according to claim 1 in which the envelope has a wall opposite the pockets spaced away from the adjacent portion of the pockets a distance greater than the depth of the adjacent pocket.

4. A mold according to claim 1 in which the flexible freezing pockets are all similar in size and shape and have axes extending substantially perpendicular to said one side.

5. A mold according to claim 1 in which the envelope has a substantially flat wall opposite the open end thereof.

References Cited by the Examiner

UNITED STATES PATENTS

| 2,591,261 | 4/1952 | Holahan | 249—119 X |
| 2,663,461 | 12/1953 | Brown. | |
| 2,726,517 | 12/1955 | Pruett | 249—53 X |
| 3,093,866 | 6/1963 | Angioletti | 249—170 X |

J. SPENCER OVERHOLSER, *Primary Examiner.*

E. MAR, *Assistant Examiner.*